United States Patent
Mignault

Patent Number: 5,978,190
Date of Patent: Nov. 2, 1999

[54] GROUND FAULT DETECTOR FOR GAS DISCHARGE TUBING

[75] Inventor: Peter R. Mignault, Dorval, Canada

[73] Assignee: Neonics Technology Inc., Pointe-Claire, Canada

[21] Appl. No.: 08/902,299

[22] Filed: Jul. 29, 1997

[30] Foreign Application Priority Data

Dec. 24, 1996 [CA] Canada ................................ 2193909

[51] Int. Cl.⁶ ........................................................ H02H 3/00
[52] U.S. Cl. ............................................. 361/42; 361/35
[58] Field of Search ................................. 361/42, 35, 38; 323/274–278, 284–286

[56] References Cited

U.S. PATENT DOCUMENTS

| | | | |
|---|---|---|---|
| 4,613,934 | 9/1986 | Pacholok | 363/131 |
| 4,663,571 | 5/1987 | Nilssen | 315/244 |
| 5,847,909 | 12/1998 | Hopkins et al. | 361/35 |

*Primary Examiner*—Michael J. Sherry
*Attorney, Agent, or Firm*—Pascal & Associates

[57] ABSTRACT

A ground fault circuit comprising: a power supply, and a transformer having a primary winding driven by the power supply and a high voltage secondary winding, a shutdown control circuit having a controllable switch and a control input coupled to the controllable switch for causing operation of the controllable switch when a trigger voltage applied to the control input is exceeded, the shutdown control circuit being coupled to the power supply for controlling shut-down of the power supply when the switch is in operation, a circuit connected to the high voltage secondary winding for detecting leakage current from the transformer to ground, for short circuiting an A.C. component of the leakage current passing through the detector to ground, and for deriving a D.C. voltage from D.C. leakage current from the transformer to ground, and a circuit for applying the derived D.C. voltage to the control input of the shutdown control circuit, whereby the power supply may be shut down in the presence of leakage current in excess of the trigger voltage which is derived exclusively from D.C. current leakage from the transformer to ground.

13 Claims, 1 Drawing Sheet

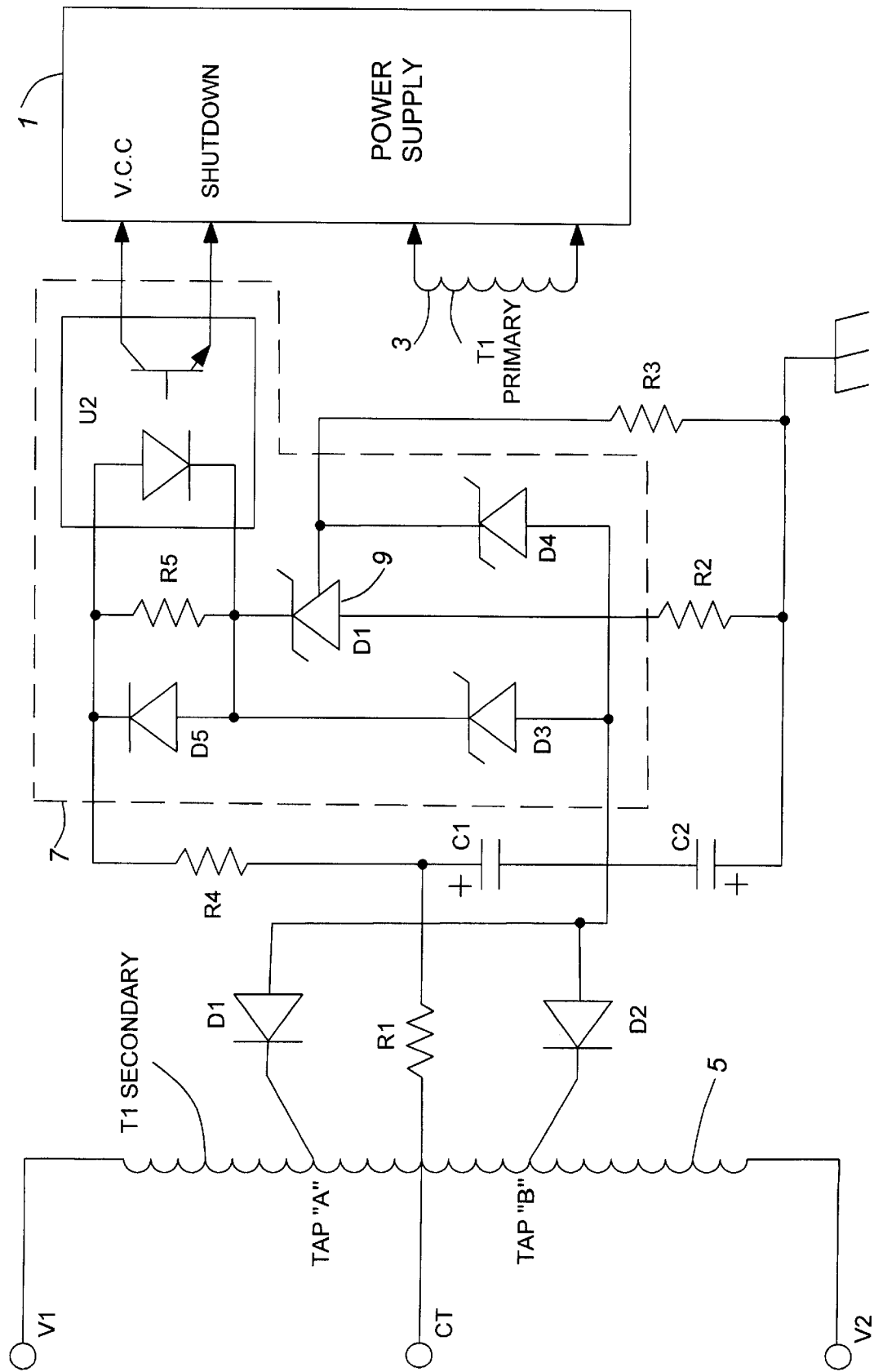

GROUND FAULT DETECTOR FOR GAS DISCHARGE TUBING

FIELD OF THE INVENTION

This invention relates to the field of ground fault detectors, and particularly ground fault detectors used in high voltage circuits.

BACKGROUND TO THE INVENTION

Ground fault detectors are used in high voltage circuits such as in ballasts which drive gas discharge tubes such as neon display tubes. A ground fault detector is used to safeguard current carrying circuits, detecting leakage current to ground and shutting off the power supply of the ballast in the event the leakage current exceeds a predetermined value. Excessive leakage current can cause arcing, which can cause fire or can be lethal, and therefore maximum leakage is regulated by standards.

One of the conventional ways of controlling the shut-off of the high voltage is to monitor the alternating current which is returned to ground carried by the center tap of the high voltage secondary winding of a high voltage transformer. In the event the high voltage leads of the secondary winding are conducting to ground, causing current to flow from the center tap to ground, a current transformer reflects this back to a shutdown circuit. Examples of circuits which use this principle are described in U.S. Pat. No. 4,663,571 to Nilssen and U.S. Pat. Nos. 4,613,934 and 5,089,572 to Pacholok.

Another conventional way of controlling shut-down of a high voltage circuit is to detect the inherent phase shift between current and voltage when the high voltage is radiated capacitively to ground. However, the realized circuit requires a phase discriminator circuit and a high parts count, which is costly.

A typical ground fault detector is comprised of a solid state switch which accepts a trigger voltage and conducts to operate a relay, etc. when the trigger voltage is exceeded. The relay operates switch contacts in the power supply, shutting down the power supply. The trigger voltage is derived by detecting the leakage current and converting this current to a voltage which is rectified and is applied to the solid state switch, which will operate if the voltage, and thus the current, is large enough. Ground fault detector circuits of this type are described, for example, in U.S. Pat. No. 4,114,089 to Ahmed, U.S. Pat. No. 3,899,717 to Legatti et al and U.S. Pat. No. 4,138,707 to Gross.

The leakage current detected in the aforenoted structures constitutes radiated or reactive alternating current, similar to current emitted from a radio frequency transmitter. The return energy is purely capacitive to ground. If the energy emitted by both high voltage leads (e.g. the antennae) of the secondary winding of the high voltage transformer of the ballast is not balanced capacitively, a current will flow through the center tap of the secondary winding to ground, creating an A.C. voltage which is detected as leakage current, and causing a false shutdown of the power supply.

It has been determined that hazardous arcing to ground can be detected solely from the D.C. current flowing from a D.C. biased winding to ground, rather than from the A.C. reactive current to ground. The systems described above shut down in the presence of A.C. reactive current, even without the presence of additional resistive current, which causes the false shutdown. The prior art systems are thus not reliable detectors of the hazardous currents.

SUMMARY OF THE INVENTION

The present invention is a ground fault detector circuit which ignores the A.C. leakage current caused by radiation, unbalanced radiation current, etc., and provides a trigger voltage which is caused by true direct current leakage during dielectric breakdown. It generates the trigger voltage by short circuiting A.C. leakage current, and detects only D.C. (resistive path) leakage current, applying a voltage derived from the D.C. leakage current to the trigger input of a solid state switching device such as a programmable shunt regulator.

The present invention thus provides reliable detection and high voltage shut down for D.C. leakage current which would otherwise be hazardous, ignoring A.C. radiated current.

In accordance with an embodiment of the invention, a method of shutting down a power supply which drives a transformer having a center-tapped high voltage secondary winding, comprises short circuiting A.C. leakage current that may flow between the secondary winding and ground, detecting D.C. voltage caused by D.C. leakage current which may be conducted between the D.C. biased secondary winding and ground, applying the D.C. voltage to the control input of a switch, and controlling shut-down of the power supply by means of the switch.

In accordance with another embodiment, a ground fault circuit comprises (a) a power supply, and a transformer having a primary winding driven by the power supply and a high voltage secondary winding, (b) a shutdown control circuit having a controllable switch and a control input coupled to the controllable switch for causing operation of the controllable switch when a trigger voltage applied to the control input is exceeded, the shutdown control circuit being coupled to the power supply for controlling shut-down of the power supply when the switch is in operation, (c) a circuit connected to the high voltage secondary winding for detecting leakage current from the D.C. biased transformer to ground, for short circuiting an A.C. component of the leakage current passing through the detector to ground, and for deriving a D.C. voltage from D.C. leakage current from the transformer to ground, and (d) a circuit for applying the derived D.C. voltage to the control input of the shutdown control circuit, whereby the power supply may be shut down in the presence of leakage current in excess of the trigger voltage which is derived exclusively from D.C. current leakage from the transformer to ground.

BRIEF INTRODUCTION TO THE DRAWINGS

A better understanding of the invention will be obtained from an understanding of the detailed description below, with reference to the following drawing, in which:

The single FIGURE is a schematic drawing of a preferred embodiment of the invention.

DETAILED DESCRIPTION OF PREFERRED EMBODIMENT

A power supply 1, for example one which drives a neon gas discharge tube, has a shutdown control input which, when driven by a voltage VCC, shuts down the power supply in a conventional manner. A loosely coupled transformer is comprised of a primary winding 3 which is driven by the power supply, and a high voltage secondary winding 5. Ends V1 and V2 of the secondary winding are to be connected to a gas discharge tube.

The secondary winding has a center tap CT, and a balanced pair of taps A and B on either side of the center tap for obtaining a small representative portion of the high voltage produced by the secondary winding. A pair of diodes D1 and D2 having their cathodes connected to the respective taps, have their anodes connected together and to the negative terminal of a capacitor C1. The positive terminal of capacitor C1 is connected via resistor R1 to the center tap of secondary winding 5.

The diodes rectify the small portion of the high voltage, resulting in a D.C. voltage across capacitor C1 which has been charged through resistor R1. This D.C. voltage creates a D.C. bias of the center tap with respect to the potential at the negative terminal of capacitor C1. In a successful embodiment, the D.C. voltage across capacitor C1 was 25 volts.

Capacitor C2 and resistor R2 are connected in parallel between the negative terminal of capacitor C1 and ground. This provides an A.C. shunt path to ground, to maintain a low A.C. voltage from the center tap CT of the secondary winding 5 to ground, via the path R1, C1, C2 and R2.

If there is A.C. radiated leakage current between the secondary winding 5 and ground, this current is short circuited by capacitor C2.

If there is no D.C. leakage current from the D.C. biased transformer secondary winding to ground (e.g. caused by dielectric breakdown), there will be no net D.C. voltage across capacitor C2. Thus the D.C. potential at the negative terminal of capacitor C1 will be the same as that at the positive terminal of capacitor C2, i.e. ground potential.

However, if there is D.C. leakage to ground, capacitor C2 will begin to charge. The voltage will appear across resistor R2, which is applied to the control input of a shutdown control circuit 7. The value of resistor R2 should be chosen to trigger control circuit 7 if a predetermined D.C. leakage current level is reached.

The shutdown control circuit 7 is preferably comprised of a programmable shunt regulator U1, which has a switch control input 9. The shunt regulator is functionally similar to an NPN bipolar transistor in operation, except that the threshold voltage to turn it on (into a conducting state from anode to cathode) is about 2.5 volts.

The cathode of shunt regulator U1 is connected to one terminal of the photodiode (e.g. light emitting diode) of an optocoupler U2, the other terminal of which is connected via a current limiting resistor R4 to the positive terminal of capacitor C1. The anode of shunt regulator U1 is connected to the junction of the negative terminals of capacitors C1 and C2 and the anodes of diodes D1 and D2.

Resistor R3 is connected between the control terminal of shunt regulator U1 and ground. Thus the voltage across resistor R2 is applied between the control input of shunt regulator U1 through resistor R3 and the anode of shunt regulator U1.

In operation, when the D.C. voltage caused by D.C. leakage to ground from the D.C. biased secondary winding 5 of transformer T1 is equal to or is in excess of the turn-on voltage of shunt regulator U1, e.g. 2.5 volts or higher, shunt regulator U1 is triggered, and it becomes conductive between its cathode and anode. Current resulting from the rectified voltage which appears across capacitor C1 from tansformer T1, passes through the photodiode of optocoupler U2 and shunt regulator U1, causing the phototransistor in the optocoupler which is connected between the VCC and the shutdown terminals of the power supply 1 to conduct, causing the power supply to shut down. The inverter in the ballast is thereby triggered to shut down.

In addition, it is preferred to connect resistor R5 across the light emitting diode of optocoupler U2, to prevent the optocoupler from turning on as a result of anode to cathode leakage current of the shunt regulator. A diode D5 is also preferred to be connected across the photodiode of the optocoupler U2 in oppositely poled direction to the light emitting diode, to prevent damage to the photodiode from reverse voltage spikes. A diode D4 is connected between the control input and the anode of the shunt regulator U1, with its anode connected to the anode of the shunt regulator, to protect the shunt regulator from reverse voltage spikes.

A diode D3 is preferably connected across the shunt regulator U1 in the same polarity direction, as a limiting shunt to protect the shunt regulator from damage in case the secondary winding voltage goes to high, and to protect the shunt regulator from reverse voltage spikes. If diode D3 is caused to conduct from one of these two events, it will cause the optocoupler to operate, and will thereby trigger the power supply and therefore the inverter to shut down as if the shunt regulator had turned on from D.C. ground fault current. Thus the inverter is provided with monitoring of excessive voltage in the high voltage secondary winding 5.

A person skilled in the art understanding the above description may now consider other embodiments using the principles described above. All such embodiments which are within the spirit and scope of the claims appended hereto are considered to be part of the present invention.

I claim:

1. A ground fault circuit comprising:
   (a) a power supply, and a transformer having a primary winding driven by the power supply and a high voltage secondary winding,
   (b) a shutdown control circuit having a controllable switch and a control input coupled to the controllable switch for causing operation of the controllable switch when a trigger voltage applied to the control input is exceeded, the shutdown control circuit being coupled to the power supply for controlling shut-down of the power supply when the switch is in operation,
   (c) a circuit connected to the high voltage secondary winding for detecting leakage current from the transformer to ground, for short circuiting an A.C. component of the leakage current passing through the detector to ground, and for deriving a D.C. voltage from D.C. leakage current from the transformer to ground, and
   (d) a circuit for applying the derived D.C. voltage to the control input of the shutdown control circuit,
      whereby the power supply may be shut down in the presence of leakage current in excess of the trigger voltage which is derived exclusively from D.C. current leakage from the transformer to ground.

2. A circuit as defined in claim 1 in which the secondary winding is center-tapped, and in which the detecting circuit is connected between the center tap and ground.

3. A circuit as defined in claim 2 in which the detecting circuit and the short circuiting circuit are comprised of a capacitor connected in parallel with a resistor having one junction connected to ground and another junction coupled to the center tap, the capacitor and resistor being coupled to the control input of the control circuit.

4. A circuit as defined in claim 3 including a circuit for deriving a bias D.C. voltage from the secondary winding and for applying the bias D.C. voltage across the controllable switch.

5. A circuit as defined in claim 4 in which the circuit for deriving a bias D.C. voltage from the secondary winding is comprised of a rectifier circuit connected across a fraction of the secondary winding, the detecting circuit and short circuiting circuit being connected to the rectifier circuit.

6. A circuit as defined in claim 5 in which the circuit for deriving a D.C. voltage is connected between a center tap of the secondary winding and balanced spaced taps of the secondary winding on either side of the center tap.

7. A circuit as defined in claim 2 in which the detecting circuit is comprised of a rectifier circuit connected to an off-center tap of the secondary winding, and a first capacitor in series with a first resistor connected between the rectifier circuit and the center tap of the secondary winding.

8. A circuit as defined in claim 7 in which the rectifier circuit is comprised of a full wave rectifier comprised of a pair of diodes having cathodes connected to respective off-center taps located at balanced locations of the secondary winding, the anodes of the diodes being connected together to a negative terminal of the first capacitor, the positive terminal of the first capacitor being connected to a terminal of the first resistor, the detecting circuit further comprising a second capacitor having a negative terminal connected to the junction of the first capacitor and the anodes of the diodes, and having a positive terminal connected to ground, and a second resistor connected in parallel with the second capacitor, the second capacitor and second resistor being coupled to the control input of the switch.

9. A circuit as defined in claim 8 in which the first capacitor is coupled to the switch for applying a D.C. voltage appearing across the first capacitor, across the switch.

10. A circuit as defined in claim 9 in which the switch is comprised of a switchable solid state device having said control input, connected in series with a light emitting diode of an optocoupler, a light sensitive device of the optocoupler being coupled to a shutdown control input of the power supply, D.C. voltage appearing across the first capacitor being applied through current limiting means across the series combination of the switchable solid state device and light emitting diode of the optocoupler.

11. A circuit as defined in claim 10 in which the switch is a programmable shunt regulator having its anode connected to the junction of the anodes of the pair of diodes and the negative terminal of the first capacitor, and further including a third resistor connected between the control input of the shunt regulator and ground.

12. A method of shutting down a power supply which drives a transformer having a center-tapped high voltage secondary winding, comprising short circuiting A.C. leakage current that may flow between the secondary winding and ground, detecting D.C. voltage caused by D.C. leakage current which may be conducted between the D.C. biased secondary winding and ground, applying the D.C. voltage to the control input of a switch, and controlling shut-down of the power supply by means of the switch.

13. A method as defined in claim 12 including tapping a fraction of A.C. voltage appearing across the high voltage secondary winding, rectifying the fraction of the A.C. voltage to derive a D.C. bias voltage, applying the D.C. bias voltage to the transformer, and applying the D.C. bias voltage across the switch for operation thereof.

* * * * *